(12) United States Patent
Tsorng et al.

(10) Patent No.: US 8,154,861 B2
(45) Date of Patent: Apr. 10, 2012

(54) HARD DRIVE DECK

(75) Inventors: Yaw-Tzorng Tsorng, Tao Yuan Shien (TW); Hsueh-Chin Lu, Tao Yuan Hsien (TW); Chen-Sheng Tang, Tao Yuan Shien (TW)

(73) Assignee: Quanta Computer Inc. (TW)

( * ) Notice: Subject to any disclaimer, the term of this patent is extended or adjusted under 35 U.S.C. 154(b) by 1401 days.

(21) Appl. No.: 11/783,356

(22) Filed: Apr. 9, 2007

(65) Prior Publication Data

US 2008/0101007 A1 May 1, 2008

(30) Foreign Application Priority Data

Oct. 30, 2006 (TW) ................................ 95219134 U

(51) Int. Cl.
*H05K 5/00* (2006.01)
*H05K 7/00* (2006.01)
(52) U.S. Cl. ......... 361/679.33; 361/679.02; 361/679.37; 361/679.38

(58) Field of Classification Search ............. 361/679.01, 361/679.33, 679.02, 679.37, 679.38
See application file for complete search history.

(56) References Cited

U.S. PATENT DOCUMENTS

| 6,188,571 | B1 * | 2/2001 | Roganti et al. ........... 361/679.33 |
| 7,433,183 | B2 * | 10/2008 | Huang ..................... 361/679.33 |

* cited by examiner

*Primary Examiner* — Anthony Haughton
(74) *Attorney, Agent, or Firm* — Rabin & Berdo, PC

(57) ABSTRACT

A hard drive deck is described. A base portion comprises a first fastening portion, a second fastening portion and a support leg. The support leg has a positioning hole and the first fastening portion has a plurality of slots such that the base portion is fastened to a computer housing. A hard drive housing is secured on the base portion. The hard drive hosing comprises an insert opening and a third fastening portion, wherein the insert opening allows a hard disk drive to be plugged into. A L-shaped frame comprises a first screw hole and a second screw hole. The first screw hole and the second screw hole are located on two ends of the L-shaped frame. The second fastening portion and the third fastening portion are secured to the first screw hole and the second screw hole.

13 Claims, 2 Drawing Sheets

HARD DRIVE DECK

RELATED APPLICATIONS

This application claims priority to Taiwan Application Serial Number 95219134, filed Oct. 30, 2006, which is herein incorporated by reference.

BACKGROUND

1. Field of Invention

The present invention relates to a hard drive deck for accommodating and connecting a hard disk drive.

2. Description of Related Art

Nowadays, how a space inside a computer system being used is carefully considered and no space should be idle. For instance, a housing of a standard computer server, i.e. a 1-U sever, has been restricted to a specified size. When an unused space exists in its housing, efforts is taken to fill the unused space. Therefore, a non-standard hard drive deck is a choice to fill in the unused space.

SUMMARY

A hard drive deck includes the following components. A base portion, comprises a first fastening portion, a second fastening portion and a support leg, wherein the support leg has a positioning hole and the first fastening portion has a plurality of slots such that the base portion is fastened to a computer housing. A hard drive housing is secured on the base portion. The hard drive hosing comprises an insert opening and a third fastening portion, wherein the insert opening allows a hard disk drive to be plugged into. A L-shaped frame comprises a first screw hole and a second screw hole. The first screw hole and the second screw hole are located on two ends of the L-shaped frame, wherein the second fastening portion and the third fastening portion are secured to the first screw hole and the second screw hole.

It is to be understood that both the foregoing general description and the following detailed description are by examples, and are intended to provide further explanation of the invention as claimed.

BRIEF DESCRIPTION OF THE DRAWINGS

The accompanying drawings are, included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
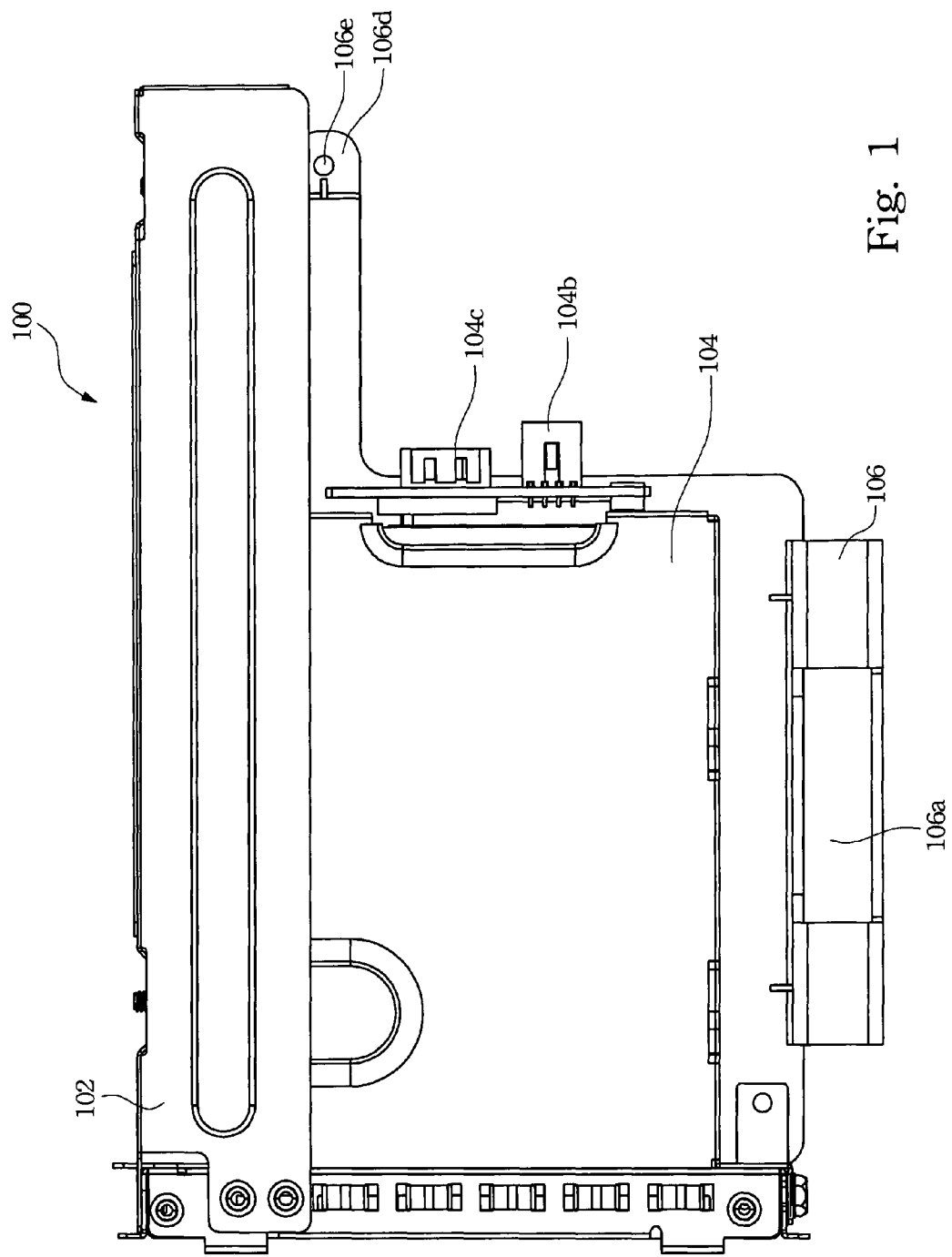
FIG. 1 illustrates a top view of a hard drive deck according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
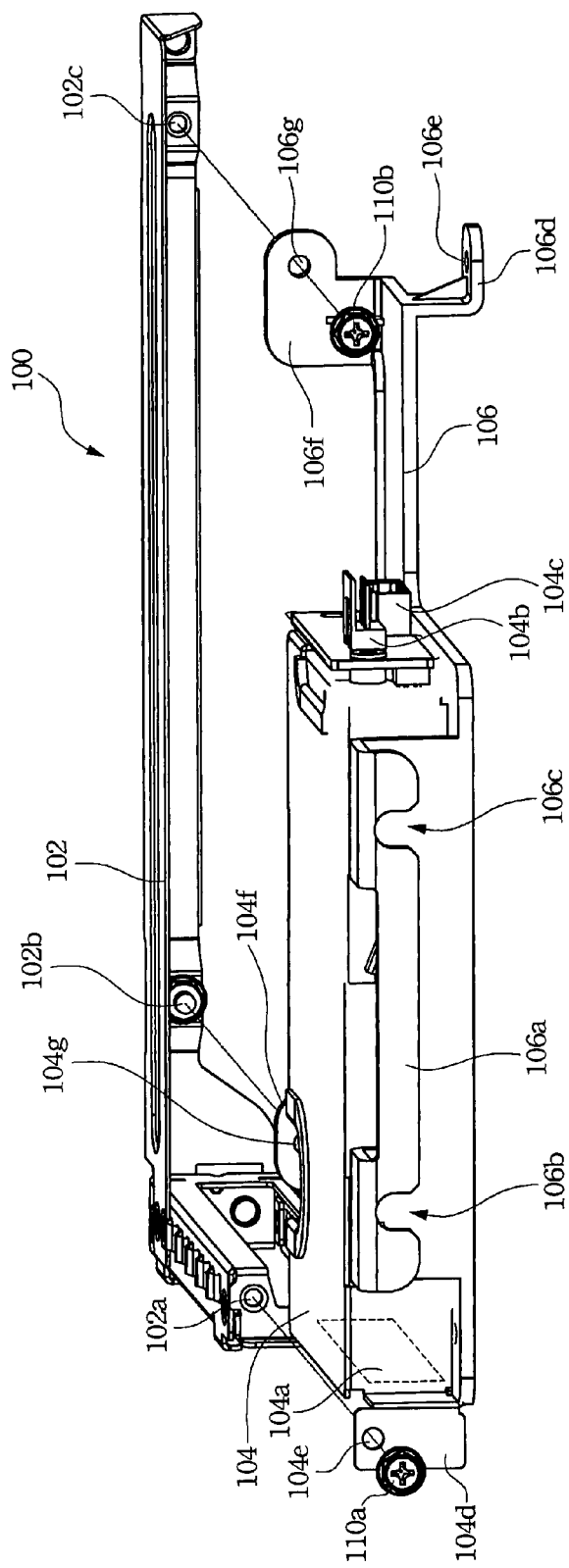
FIG. 2 illustrates an exploded view of a hard drive deck according to one preferred embodiment of this invention.
Figure 3:
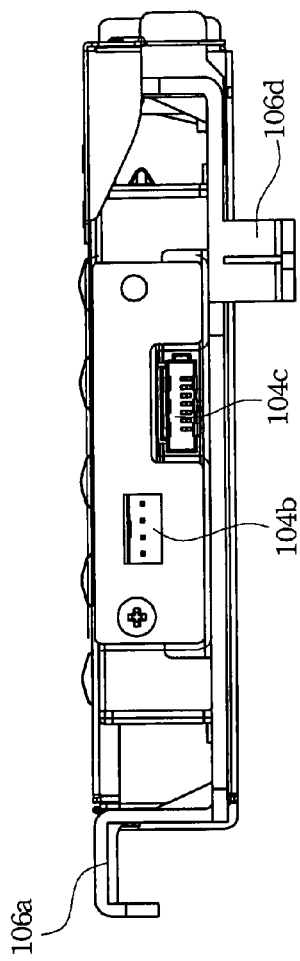
FIG. 3 illustrates a side view of a hard drive deck according to one preferred embodiment of this invention.

FIG. 1 illustrates a top view of a hard drive deck according to one preferred embodiment of this invention. FIG. 2 illustrates an exploded view of the hard drive deck in FIG. 1. FIG. 3 illustrates a side view of the hard drive deck in FIG. 1.

Please refer to FIGS. 1-3. The hard drive deck 100 is designed to fill in an unused space of a standard computer system. The hard drive deck 100 includes a L-shaped frame 102, a hard drive housing 104 and a base portion 106. The base portion 106 is a metallic rectangular plate with a support leg 106d and two fastening portion 106a/106f. The support leg 106d has a positioning hole 106e and the fastening portion 106a has two slots 106b/106c, the base portion 106 is thus secured to a computer housing by means of such structures. The fastening portion 106a is an inversed-U structure, and is located on one side of the rectangular base portion 106. Two slots 106b/106c are located on the inversed-U structure for engaging with corresponding portions of the computer housing. The support leg 106d and the fastening portion 106f respectively extend from one corner of the rectangular base portion 106, the support leg 106d goes downward and the fastening portion 106f goes upright. The positioning hole 106e of the support leg 106d is to engage with a corresponding positioning pin (not illustrated) of the computer housing. The base portion 106 can be made of metallic or plastic materials.

Metallic hard drive housing 104 is secured on top of the base portion 106. The hard drive housing 104 includes an insert opening 104a, a fastening portion 104d and a fastening portion 104f. The insert opening 104a should be exposed by a computer housing, thereby allowing a hard disk drive to be plugged into. The hard drive housing 104 further includes a power connector 104b and a signal connector 104c, respectively electrically connected with a power supply and a main board of a computer system. When the hard disk drive is inserted into the hard drive housing 104 and coupled to the power connector 104b and the signal connector 104c, the hard disk drive can function properly.

The L-shaped frame 102 surrounds two adjacent edges of the rectangular base portion 106 and two adjacent edges of the hard drive housing 104. The fastening portion 106a is not in the area surrounded by the L-shaped frame 102. L-shaped frame 102 includes screw holes 102a/102c and a positioning pin 102b. The screw holes 102a/102c are located on two ends of the L-shaped frame 102. A screw 110a is led through the hole 104e of the fastening portion 104d and screwed into the screw hole 102a (equipped with threads inside). A screw 110b is led through the hole 106g of the fastening portion 106f and screwed into the screw hole 102c (equipped with threads inside). The positioning pin 102b engages with a positioning hole 104g of the fastening portion 104f of the hard drive housing 104. By above-mentioned fastening, the L-shaped frame 102 can be secured to the hard drive housing 104 and the base portion 106. The combination of the L-shaped frame 102, the hard drive housing 104 and the base portion 106 can be readily installed in an unused space of a standard computer system.

According to the embodiment discussed above, the hard drive deck of the present invention can be readily installed in an unused space of a standard computer system by a screw fastening such that all space in the standard computer system is effectively used.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hard drive deck, comprising:
   a base portion, comprising a first fastening portion, a second fastening portion and a support leg, wherein the support leg has a positioning hole and the first fastening portion has a plurality of slots such that the base portion is fastened to a computer housing, the second fastening portion extending upwardly from a corner of the base portion and the support leg extending downwardly from said corner; and
   a rectangular hard drive housing, secured on the base portion, the rectangular hard drive housing comprising an insert opening and a third fastening portion, wherein the insert opening allows a hard disk drive to be plugged into and accommodated within the rectangular hard drive housing; and
   a L-shaped frame, comprising a first screw hole and a second screw hole, the first screw hole and the second screw hole being located on two ends of the L-shaped frame, wherein the second fastening portion and the third fastening portion are secured to the first screw hole and the second screw hole respectively.

2. The hard drive deck of claim 1, wherein the base portion is a rectangular base portion.

3. The hard drive deck of claim 2, wherein the first fastening portion is an inverse-U structure and located on one edge of the rectangular base portion.

4. The hard drive deck of claim 2, wherein the L-shaped frame surrounds two adjacent edges of the rectangular base portion.

5. The hard drive deck of claim 4, wherein the first fastening portion is not within the area surrounded by the L-shaped frame.

6. The hard drive deck of claim 1, wherein the rectangular hard drive housing further comprises a power connector.

7. The hard drive deck of claim 1, wherein the rectangular hard drive housing further comprises a signal connector.

8. The hard drive deck of claim 1, wherein the L-shaped frame further comprises a positioning pin disposed between the first screw hole and the second screw hole.

9. The hard drive deck of claim 8, wherein the rectangular hard drive housing further comprises a fourth fastening portion, having a positioning hole engaging with the positioning pin.

10. The hard drive deck of claim 1, wherein the rectangular hard drive housing is a metallic hard drive housing.

11. The hard drive deck of claim 1, wherein the base portion is a metallic base portion.

12. The hard drive deck of claim 1, wherein the base portion is a plastic base portion.

13. The hard drive deck of claim 1, wherein the second fastening portion and support leg both touch said corner.

* * * * *